(12) United States Patent
Lun et al.

(10) Patent No.: US 6,655,511 B1
(45) Date of Patent: Dec. 2, 2003

(54) MAGNETORHEOLOGICAL PISTON HAVING A CORE

(75) Inventors: Saiman Lun, Centerville, OH (US); Ilya Lisenker, Miamisburg, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/266,367

(22) Filed: Oct. 8, 2002

(51) Int. Cl.[7] ............................................... F16F 15/03
(52) U.S. Cl. ..................................................... 188/267
(58) Field of Search ............................ 188/267, 267.1, 188/267.2

(56) References Cited

U.S. PATENT DOCUMENTS

| | | | |
|---|---|---|---|
| 4,819,772 A | 4/1989 | Rubel | 188/299 |
| 5,259,487 A | 11/1993 | Petek | 188/267 |
| 5,284,330 A | 2/1994 | Carlson et al. | 267/140.14 |
| 5,316,112 A | 5/1994 | Kimura et al. | 188/267 |
| 5,333,708 A | 8/1994 | Jensen et al. | 188/322.14 |
| 5,398,917 A | 3/1995 | Carlson et al. | 267/140.14 |
| 5,510,988 A | 4/1996 | Majeed et al. | 364/424.05 |
| 5,522,481 A | 6/1996 | Watanabe | 188/267 |
| 5,551,540 A | 9/1996 | Forster et al. | 188/299 |
| 5,588,509 A | 12/1996 | Weitzenhof et al. | 188/267 |
| 5,598,908 A * | 2/1997 | York et al. | 188/267 |
| 5,632,361 A | 5/1997 | Wulff et al. | 188/267 |
| 5,878,851 A * | 3/1999 | Carlson et al. | 188/267 |
| 5,947,238 A | 9/1999 | Jolly et al. | 188/267.1 |
| 6,065,572 A | 5/2000 | Schober et al. | 188/267 |
| 6,095,486 A | 8/2000 | Ivers et al. | 251/129.01 |
| 6,131,709 A | 10/2000 | Jolly et al. | 188/267.2 |
| 6,151,930 A | 11/2000 | Carlson | 68/12.06 |
| 6,158,470 A | 12/2000 | Ivers et al. | 137/807 |
| 6,161,662 A | 12/2000 | Johnston et al. | 188/282.3 |
| RE37,015 E | 1/2001 | Rensel et al. | 188/267.1 |
| 6,260,675 B1 | 7/2001 | Muhlenkamp | 188/267 |
| 6,279,701 B1 | 8/2001 | Namuduri et al. | 188/267.2 |
| 6,279,702 B1 | 8/2001 | Koh | 188/267.2 |
| 6,311,810 B1 | 11/2001 | Hopkins et al. | 188/267.2 |
| 6,318,519 B1 | 11/2001 | Kruckemeyer et al. | 188/267 |
| 6,318,520 B1 | 11/2001 | Lisenker et al. | 188/267 |
| 6,318,521 B1 | 11/2001 | Niaura et al. | 188/267.1 |

FOREIGN PATENT DOCUMENTS

| | | |
|---|---|---|
| DE | 19820570 A1 | 11/1999 |
| JP | 58-221034 | 12/1983 |
| JP | 63-180742 | 7/1988 |
| JP | 4-266636 | 9/1992 |
| JP | 6-42571 | 2/1994 |
| JP | 6-50375 | 2/1994 |
| JP | 6-66342 | 3/1994 |
| JP | 9-303473 | 11/1997 |

* cited by examiner

Primary Examiner—Christopher P. Schwartz
(74) Attorney, Agent, or Firm—Scott A. McBain

(57) ABSTRACT

A magnetorheological piston includes a magnetorheological-piston coil and a magnetorheological-piston core. The magnetorheological-piston coil has a longitudinal axis. In one expression, the magnetorheological-piston core includes at least two separate core pieces, wherein each of the core pieces is a powder-metal core piece, and wherein the coil is positioned to circumferentially surround at least a portion of at least one of the core pieces. In another expression, the magnetorheological-piston core includes separate upper core, center core, and lower core pieces. The center core piece is located longitudinally between the upper core and lower core pieces and has a circumferential surface positioned radially inward from the inner-diameter portion of the coil. The coil is longitudinally positioned between the upper core and lower core pieces. In one example, each of the upper core, center core, and lower core pieces is a powder-metal core piece.

12 Claims, 1 Drawing Sheet

MAGNETORHEOLOGICAL PISTON HAVING A CORE

TECHNICAL FIELD

The present invention relates generally to piston dampers, and more particularly to a magnetorheological (MR) piston.

BACKGROUND OF THE INVENTION

Conventional piston dampers include MR dampers having a cylinder containing an MR fluid and having an MR piston which slideably engages the cylinder. The MR fluid passes through an orifice of the MR piston. Exposing the MR fluid in the orifice to a varying magnetic field, generated by providing a varying electric current to an electric coil of the MR piston, varies the damping effect of the MR fluid in the orifice providing variably-controlled damping of relative motion between the MR piston and the cylinder. The electric current is varied to accommodate varying operating conditions, as is known to those skilled in the art. A rod has a first end attached to the upper end of the MR piston and a second end extending outside the cylinder. The cylinder and the rod are attached to separate structures to dampen relative motion of the two structures along the direction of piston travel.

A known design includes an MR piston having a substantially annular, magnetically energizable passageway (the above-described orifice) and a magnetically non-energizable passageway (also called a bypass) positioned radially inward from the magnetically energizable passageway. The MR piston includes a one-piece piston core machined from a steel bar, an electric coil (also called an MR piston coil) disposed in a circumferential recess of the piston core, upper and lower piston plates longitudinally bounding the MR piston core, and a piston ring circumferentially surrounding the piston core and the coil. The coil is a wound length of electrically-insulated wire having one end electrically attached to an electrically-insulated electrode which passes through the piston core and having the other end grounded to the piston core. A plastic lining is molded over the piston core and to the wall of the electrode/coil wire passageway of the piston core to further insulate the piston core from the coil and to locate the electrode through the center of the passageway of the piston core. Another layer of plastic is molded over the coil to protect the wire from damage from the velocity of the MR fluid flow in the magnetically energizable passageway formed from a longitudinal space between the piston ring and the piston core/coil assembly.

What is needed is an improved magnetorheological piston.

SUMMARY OF THE INVENTION

In a first expression of an embodiment of the invention, a magnetorheological piston includes a magnetorheological-piston coil and a magnetorheological-piston core. The magnetorheological-piston coil has a longitudinal axis and has an inner-diameter portion and an outer-diameter portion. The magnetorheological-piston core includes separate upper core, center core, and lower core pieces. The center core piece is located longitudinally between the upper core and lower core pieces and has a circumferential surface positioned radially inward from the inner-diameter portion of the coil. The coil is longitudinally positioned between the upper core and lower core pieces.

In a second expression of an embodiment of the invention, a magnetorheological piston includes a magnetorheological-piston coil and a magnetorheological-piston core. The magnetorheological-piston coil has a longitudinal axis and has an inner-diameter portion and an outer-diameter portion. The magnetorheological-piston core includes separate upper core, center core, and lower core pieces. The center core piece is located longitudinally between the upper core and lower core pieces and has a circumferential surface positioned radially inward from the inner-diameter portion of the coil. The coil is longitudinally positioned between the upper core and lower core pieces. Each of the upper core, center core, and lower core pieces is a powder-metal core piece.

In a third expression of an embodiment of the invention, a magnetorheological piston includes a magnetorheological-piston coil, a magnetorheological-piston core, a nonmagnetic sleeve, and an electrically-insulating coil end piece. The magnetorheological-piston coil has a longitudinal axis and has an inner-diameter portion and an outer-diameter portion. The magnetorheological-piston core includes separate upper core, center core, and lower core pieces. The center core piece is located longitudinally between the upper core and lower core pieces and has a circumferential surface positioned radially inward from the inner-diameter portion of the coil. The coil is longitudinally positioned between the upper core and lower core pieces. Each of the upper core, center core, and lower core pieces is a powder-metal core piece. The sleeve is longitudinally bounded by the upper core and lower core pieces and circumferentially surrounds the coil. The sleeve has an inner surface facing the coil and has an outer surface which defines an inner wall portion of a magnetically energizable passageway. The electrically-insulating coil end piece is longitudinally disposed between and in contact with the lower core piece and the coil and is longitudinally disposed between and in contact with the lower core and center core pieces.

In a fourth expression of an embodiment of the invention, a magnetorheological piston includes a magnetorheological-piston coil and a magnetorheological-piston core. The magnetorheological-piston coil has a longitudinal axis. The magnetorheological-piston core includes at least two separate core pieces, wherein each of the core pieces is a powder-metal core piece, and wherein the coil is positioned to circumferentially surround at least a portion of at least one of the core pieces.

Several benefits and advantages are derived from one or more of the expressions of an embodiment of the invention. Having at least two separate pieces which make up the magnetorheological-piston core allows a more-expensive-to-make machined piston core to be replaced with a less-expensive-to-make piston core having at least two piston core pieces such as two core pieces having less-machined or non-machined shapes. Having upper and lower core pieces longitudinally surround the piston coil and having the center core piece with a circumferential surface located radially inward from the inner-diameter of the coil, or having at least two separate core pieces, provides a construction allowing for each core piece to be a powder-metal core piece resulting in overall cost savings for the piston core. Having a non-magnetic sleeve provide protection for the coil wire from the velocity of the MR fluid eliminates the prior art step of over-molding the coil. Having the electrically-insulating coil end piece and an electrically-insulating coating on those portions of the upper core and center core pieces eliminates the plastic lining of the prior art.

DESCRIPTION OF THE PREFERRED EMBODIMENT

Figure 1:
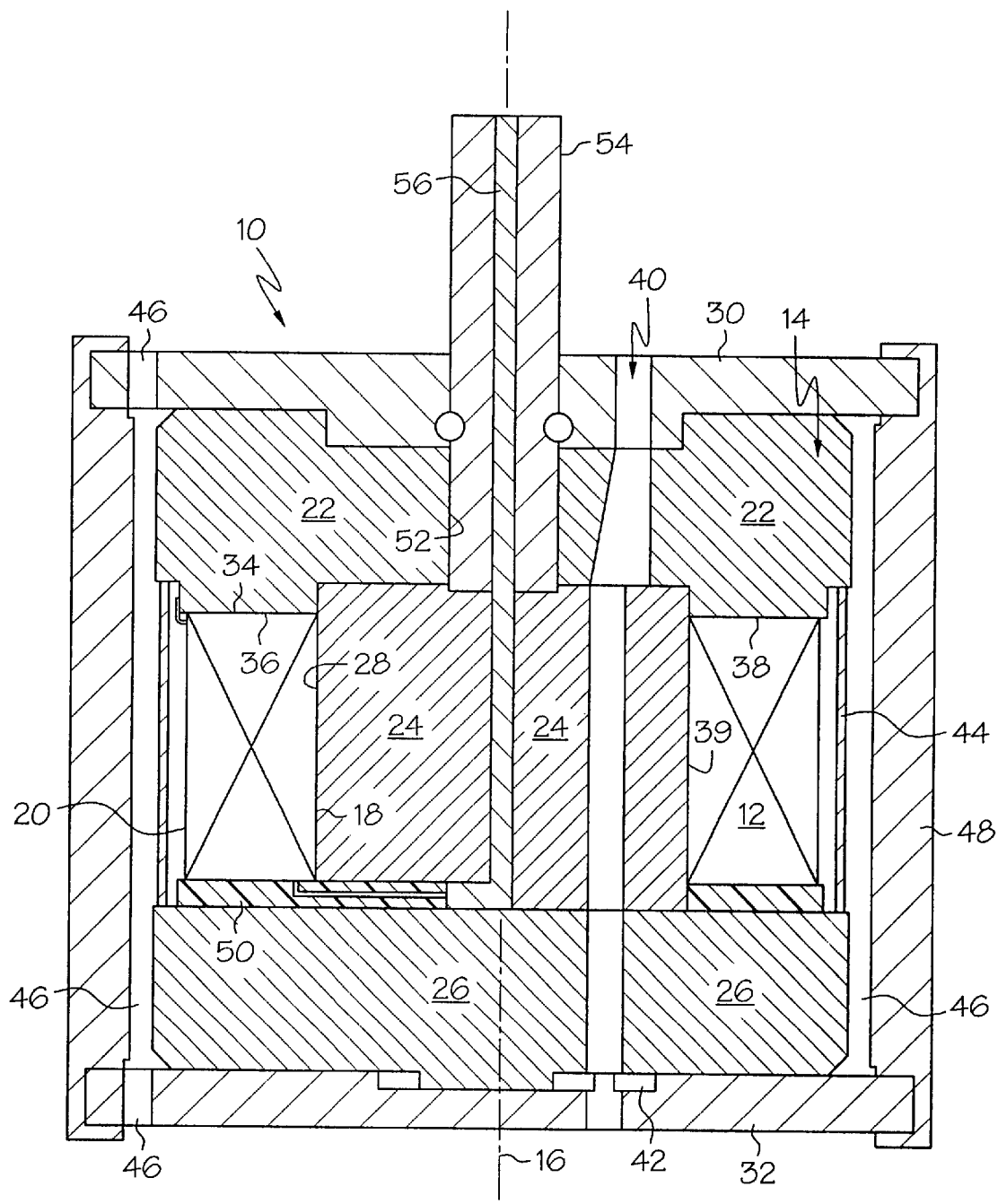
FIG. 1 is a cross-sectional view of an embodiment of the magnetorheological piston of the invention.

Referring now to the drawing, FIG. 1 shows an embodiment of a magnetorheological piston 10 of the present invention. A magnetorheological piston is also known as a magnetorheological damper piston. A magnetorheological piston is a component of a magnetorheological damper (not shown), and in one application a magnetorheological damper is used as a shock absorber for an automobile, an airplane, or other type of vehicle. Another application of a magnetorheological damper is to provide motion resistance on exercise equipment such as stair climbers and rowing machines. A further application of a magnetorheological damper is to provide motion isolation for a building, bridge, or other structure subject to earthquakes. An additional application of a magnetorheological damper is to dampen vibrations encountered by vehicles and structures in outer space. Other applications are left to the artisan.

In a first expression of the embodiment of the invention shown in FIG. 1, the magnetorheological piston 10 includes a magnetorheological-piston coil 12 and a magnetorheological-piston core 14. The magnetorheological-piston coil 12 has a longitudinal axis 16 and has an inner-diameter portion 18 and an outer-diameter portion 20. The magnetorheological-piston core 14 includes separate upper core, center core, and lower core pieces 22, 24, and 26. The center core piece 24 is disposed longitudinally between the upper core and lower core pieces 22 and 26 and has a circumferential surface 28 disposed radially inward from the inner-diameter portion 18 of the coil 12. The coil 12 is longitudinally disposed between the upper core and lower core pieces 22 and 26.

In one example of the first expression, the center core piece 24 is in contact with the upper core and lower core pieces 22 and 26. In the same or a different example, the magnetorheological piston 10 also includes an upper piston plate 30 disposed longitudinally above and in contact with the upper core piece 22 and includes a lower piston plate 32 disposed longitudinally below and in contact with the lower core piece 26. In one variation, the core pieces 22, 24, and 26 are pressed together between the piston plates 30 and 32. In the same or a different example, the upper core, center core, and lower core pieces 22, 24, and 26 are non-machined core pieces. In one construction, the upper core piece 22 is a monolithic upper core piece, the center core piece 24 is a monolithic center core piece, and the lower core piece 26 is a monolithic lower core piece.

In one enablement of the first expression, the coil 12 has an upper end portion 34, and the upper core piece 22 has a lower surface portion 36 which has an electrically-insulating coating 38 and which is in contact with the entire upper end portion 34 of the coil 12. In the same or a different embodiment, the circumferential surface 28 of the center core piece 24 has an electrically-insulating coating 39 and is in contact with the entire inner-diameter portion 18 of the coil 12. Use of a thin insulation coating eliminates use of the plastic lining of the prior art and provides more room for the coil or reduces dead length. In an alternate embodiment, the coil 12 is wound to a bobbin (not shown) which supports the electrode, wherein the bobbin is assembled to the rest of the core components in the build up of the core thus eliminating handling of the core pieces in the winder (not shown).

In one construction of the first expression, each of the upper core, center core, and lower core pieces 22, 24, and 26 is a powder-metal core piece. In one choice of materials, the powder metal consists essentially of steel powder-metal. In one application, each of the upper core, center core, and lower core pieces 22, 24, and 26 is a surface-ground powder-metal core piece. It is noted using powder-metal for the upper core, center core, and lower core pieces 22, 24, and 26 creates a magnetorheological-piston core 14 without expensive machining of a steel bar as is done in the prior art. It is also noted that using surface ground core pieces controls stack-up of the assembly. In one variation, the upper core, center core, and lower core pieces 22, 24, and 26 include aligned and longitudinally extending portions of a magnetically non-energizable passageway (also called a bypass) 40. It is pointed out that it is difficult to create a single-piece magnetorheological-piston core from powder-metal which includes a longitudinally-through passageway of dimensions to function as a bypass in a vehicle damper. It is also pointed out that, in one vehicle-damper arrangement, the portion of the magnetically non-energizable passageway 40 in the upper core piece 22 is tapered, as shown in FIG. 1, to meet a required powder-metal passageway wall thickness. In one modification, a restriction plate 42., is disposed between the lower core piece 26 and the lower piston plate 32 to limit the flow of magnetorheological fluid (not shown) in the magnetically non-energizable passageway 40. In a different construction, each of the core pieces 22, 24, and 26 is an impact-extruded core piece or a forged core piece. Other constructions are left to the artisan.

In one application of the first expression, the magnetorheological piston 10 also includes a nonmagnetic sleeve 44 longitudinally bounded by the upper core and lower core pieces 22 and 26 and circumferentially surrounding the coil 12. In one choice of materials, the sleeve 44 consists essentially of nonmagnetic stainless steel. In one modification, the sleeve 44 has an inner surface facing the coil 12 and has an outer surface which defines an inner wall portion of a magnetically energizable passageway 46 whose outer wall portion is defined by the inner surface of a piston ring 48 which is attached to the upper and lower piston plates 30 and 32.

In one enablement, the magnetorheological piston 10 additionally includes an electrically-insulating coil end piece 50 which is longitudinally disposed between and in contact with the lower core piece 26 and the coil 12 and which is longitudinally disposed between and in contact with the lower core and center core pieces 26 and 24. In one variation, the upper core piece 22 has a longitudinally extending through hole 52 coaxially aligned with the longitudinal axis 16 of the coil 12 for receiving a rod 54 containing at least a portion of an electrode 56. The coil 12 has a first end in electrical contact with the electrode 56 of the received rod 54 through a passageway extending radially in the coil end piece 50 and extending longitudinally in the center core piece 24. In one modification, the coil 12 has a second end in electrical-grounding contact with one of the upper core, center core, and lower core pieces 22, 24, and 26.

In a second expression of the embodiment of the invention shown in FIG. 1, the magnetorheological piston 10 includes a magnetorheological-piston coil 12 and a magnetorheological-piston core 14. The magnetorheological-piston coil 12 has a longitudinal axis 16 and has an inner-diameter portion 18 and an outer-diameter portion 20. The magnetorheological-piston core 14 includes separate upper core, center core, and lower core pieces 22, 24, and 26. The center core piece 24 is disposed longitudinally between the upper core and lower core pieces 22 and 26 and has a circumferential surface 28 disposed radially inward from the inner-diameter portion 18 of the coil 12. The coil 12 is longitudinally disposed between the upper core and lower core pieces 22 and 26. Each of the upper core, center core, and lower core pieces 22, 24, and 26 is a powder-metal core piece. Examples, etc. of the first expression are equally applicable to the second expression of the embodiment of FIG. 1.

In a third expression of the embodiment of the invention shown in FIG. 1, the magnetorheological piston 10 includes a magnetorheological-piston coil 12, a magnetorheological-piston core 14, a nonmagnetic sleeve 44, and an electrically-insulating coil end piece 50. The magnetorheological-piston coil 12 has a longitudinal axis 16 and has an inner-diameter portion 18 and an outer-diameter portion 20. The magnetorheological-piston core 14 includes separate upper core, center core, and lower core pieces 22, 24, and 26. The center core piece 24 is disposed longitudinally between the upper core and lower core pieces 22 and 26 and has a circumferential surface 28 disposed radially inward from the inner-diameter portion 18 of the coil 12. The coil 12 is longitudinally disposed between the upper core and lower core pieces 22 and 26. Each of the upper core, center core, and lower core pieces 22, 24, and 26 is a powder-metal core piece. The sleeve 44 is longitudinally bounded by the upper core and lower core pieces 22 and 26 and circumferentially surrounds the coil 12. The sleeve 44 has an inner surface facing the coil 12 and has an outer surface which defines an inner wall portion of a magnetically energizable passageway 46. The electrically-insulating coil end piece 50 is longitudinally disposed between and in contact with the lower core piece 26 and the coil 12 and is longitudinally disposed between and in contact with the lower core and center core pieces 26 and 24. Examples, etc. of the first expression are equally applicable to the third expression of the embodiment of FIG. 1.

In a fourth expression of an embodiment of the invention, a magnetorheological piston includes a magnetorheological-piston coil and a magnetorheological-piston core. The magnetorheological-piston coil has a longitudinal axis. The magnetorheological-piston core includes at least two separate core pieces, wherein each of the core pieces is a powder-metal core piece, and wherein the coil is positioned to circumferentially surround at least a portion of at least one of the core pieces. In one construction, each core piece is a monolithic core piece. In one example having only two core pieces, the first core piece has the combined shape of the upper and center core pieces 22 and 24, and the second core piece has the shape of the lower core piece 26. In an additional example having only two core pieces, the first core piece has the shape of the upper core piece 22, and the second core piece has the combined shape of the center and lower core pieces 24 and 26. Other examples having two or more core pieces are left to the artisan.

Several benefits and advantages are derived from one or more of the expressions of an embodiment of the invention. Having at least two separate pieces which make up the magnetorheological-piston core allows a more-expensive-to-make machined piston core to be replaced with a less-expensive-to-make piston core having at least two piston core pieces such as two core pieces having less-machined or non-machined shapes. Having upper and lower core pieces longitudinally surround the piston coil and having the center core piece with a circumferential surface located radially inward from the inner-diameter of the coil, or having at least two separate core pieces, provides a construction allowing for each core piece to be a powder-metal core piece resulting in overall cost savings for the piston core. Having a nonmagnetic sleeve provide protection for the coil wire from the velocity of the MR fluid eliminates the prior art step of over-molding the coil. Having the electrically-insulating coil end piece and an electrically-insulating coating on those portions of the upper core and center core pieces eliminates the plastic lining of the prior art.

The foregoing description of several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A magnetorheological piston comprising:
    a) a magnetorheological-piston coil having a longitudinal axis and having an inner-diameter portion and an outer-diameter portion;
    b) a magnetorheological-piston core including separate upper core, center core, and lower core pieces; and
    c) an electrically-insulating coil end piece,
    wherein the center core piece is disposed longitudinally between, and longitudinally contacts, the upper core and lower core pieces and has a circumferential surface disposed radially inward from, and radially contacting, the inner-diameter portion of the coil,
    wherein the coil is longitudinally disposed between the upper core and lower core pieces and has first and second longitudinal end portions with the first longitudinal end portion of the coil longitudinally contacting one of the upper core and lower core pieces, and
    wherein the coil end piece is longitudinally disposed between, and longitudinally contacts, the second longitudinal end portion of the coil and the other one of the upper and lower core pieces.

2. The magnetorheological piston of claim 1, also including a nonmagnetic sleeve longitudinally bounded by the upper core and lower core pieces and circumferentially surrounding, and radially spaced apart from, the coil.

3. The magnetorheological piston of claim 2, wherein the upper core piece has a longitudinally extending through hole coaxially aligned with the longitudinal axis of the coil for receiving a rod containing at least a portion of an electrode, and wherein the coil has a first end in electrical contact with the electrode of the received rod through a passageway extending radially in the coil end piece and extending longitudinally in the center core piece.

4. The magnetorheological piston of claim 3, wherein the coil has a second end in electrical-grounding contact with one of the upper core, center core, and lower core pieces.

5. The magnetorheological piston of claim 2, wherein the sleeve has an inner surface facing the coil and has an outer surface which defines an inner wall portion of a magnetically energizable passageway.

6. The magnetorheological piston of claim 1, wherein each of the upper core, center core, and lower core pieces is a powder-metal core piece.

7. The magnetorheological piston of claim 6, wherein the upper core, center core, and lower core pieces include aligned and longitudinally extending portions of a magnetically non-energizable passageway.

8. The magnetorheological piston of claim 6, wherein each of the upper core, center core, and lower core pieces is a surface-ground powder-metal core piece.

9. The magnetorheological piston of claim 1, wherein the one of the upper core and lower core pieces is the upper core piece, and wherein the other one of the upper core and lower core pieces is the lower core piece.

10. The magnetorheological piston of claim 1, wherein the first longitudinal end portion of the coil is an upper end portion and wherein the upper core piece has a lower surface portion which has an electrically-insulating coating and which is in contact with the entire upper end portion of the coil.

11. The magnetorheological piston of claim 1, wherein the circumferential surface of the center core piece has an electrical-insulating coating and is in contact with the entire inner-diameter portion of the coil.

12. A magnetorheological piston comprising:
   a) a magnetorheological-piston coil having a longitudinal axis and having an inner-diameter portion and an outer-diameter portion;
   b) a magnetorheological-piston core including an upper core piece, a center core piece, and a lower core piece, wherein the center core piece is disposed longitudinally between, and longitudinally contacts, the upper core and lower core pieces and has a circumferential surface disposed radially inward from the inner-diameter portion of the coil, wherein the coil is longitudinally disposed between the upper core and lower core pieces, and wherein each of the upper core, center core, and lower core pieces is a powder-metal core piece;
   c) a nonmagnetic sleeve longitudinally bounded by the upper core and lower core pieces and circumferentially surrounding, and radially spaced apart from, the coil, wherein the sleeve has an inner surface facing the coil and has an outer surface which defines an inner wall portion of a magnetically energizable passageway; and
   d) an electrically-insulating coil end piece which is longitudinally disposed between and in contact with the lower core piece and the coil and which is longitudinally disposed between and in contact with the lower core and center core pieces.

\* \* \* \* \*